United States Patent [19]

Takigawa et al.

[11] Patent Number: 5,972,242
[45] Date of Patent: Oct. 26, 1999

[54] SMECTIC LIQUID CRYSTAL COMPOSITION AND LIQUID CRYSTAL DISPLAY

[75] Inventors: Kenji Takigawa, Nishio; Toshio Yamamoto, Kariya; Yuichiro Yamada, Nagoya; Yoshihiko Aihara, Yokohama; Shigeharu Hashimoto; Yoshiichi Suzuki, both of Tokyo, all of Japan

[73] Assignees: Denso Corporation, Kariya; Showa Shell Sekiyu Kabushiki Kaisha, Tokyo, both of Japan

[21] Appl. No.: 08/867,665

[22] Filed: Jun. 3, 1997

[30] Foreign Application Priority Data

| | | | |
|---|---|---|---|
| Jun. 4, 1996 | [JP] | Japan | 8-141924 |
| Dec. 4, 1996 | [JP] | Japan | 8-324275 |

[51] Int. Cl.$^6$ ............ C09K 19/20; C09K 19/12
[52] U.S. Cl. ............ 252/299.65; 252/299.64
[58] Field of Search ............ 252/299.64, 299.65

[56] References Cited

U.S. PATENT DOCUMENTS

| | | | |
|---|---|---|---|
| 4,973,738 | 11/1990 | Suzuki et al. | 560/80 |
| 5,194,179 | 3/1993 | Suzuki et al. | 252/299.61 |
| 5,322,639 | 6/1994 | Kawabata et al. | 252/299.62 |
| 5,417,883 | 5/1995 | Epstein et al. | 252/299.01 |
| 5,534,190 | 7/1996 | Johno et al. | 252/299.65 |
| 5,700,392 | 12/1997 | Kikuchi et al. | 252/299.01 |
| 5,705,094 | 1/1998 | Takeuchi et al. | 252/299.01 |
| 5,716,545 | 2/1998 | Kikuchi et al. | 252/299.65 |

FOREIGN PATENT DOCUMENTS

| | | |
|---|---|---|
| 1-213390 | 8/1989 | Japan. |
| 1-316339 | 12/1989 | Japan. |
| 1-316367 | 12/1989 | Japan. |
| 2-028128 | 1/1990 | Japan. |
| 2-040625 | 2/1990 | Japan. |

OTHER PUBLICATIONS

Meyer:, "Ferroelectric Liquid Crystals; A Review", Mol. Cryst.LQ.\IQ.Cryst., 1977, vol. 40, pp. 33–48.

Chandani et al:, "Tristable Switching in Surface Stabilized Ferroelectric Liquid Crystals with a Large Spontaneous Polarization", Japanese Journal of Applied Physics, vol. 27, No. 5, May 1988, pp. L729–L732.

*Primary Examiner*—C. H. Kelly
*Attorney, Agent, or Firm*—Pillsbury Madison & Sutro LLP

[57] ABSTRACT

A liquid crystal cell which minimizes disordered orientation occurring with temperature changes even across a wide range, to exhibit good contrast and high reliability, as well as a smectic liquid crystal composition for use the liquid crystal cell are provided. In smectic liquid crystal compositions having a layer construction in the liquid crystal molecular arrangement, it was found that antiferroelectric liquid crystal compositions resistant to variation in the layer spacing of the smectic phase due to temperature changes are resistant to disordered orientation. Specifically, if the antiferroelectric liquid crystal composition contains at lest 45 wt % of an antiferroelectric liquid crystal compound with roughly constant layer spacing in a temperature range from the temperature $t_1$ which gives the minimum value for the layer spacing of the smectic $C_A{}^*$ phase to −20° C., no disordered liquid crystal orientation results even after cold/hot temperature cycles. An even greater effect is achieved if the spontaneous polarization at of the composition at temperature $t_1$ is at least 160 nC/cm$^2$.

8 Claims, 10 Drawing Sheets

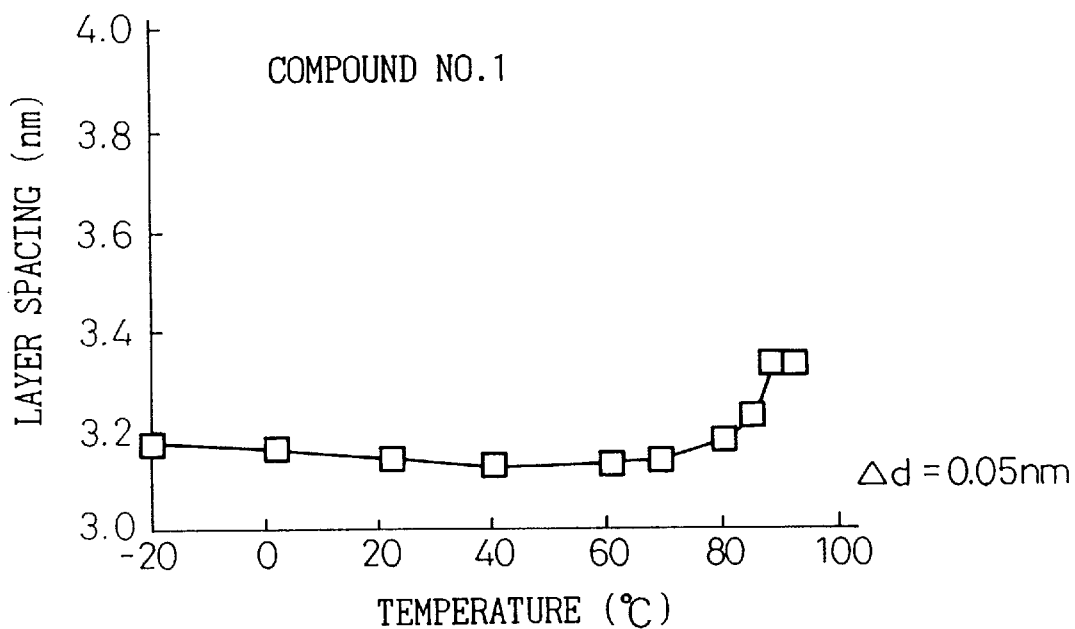
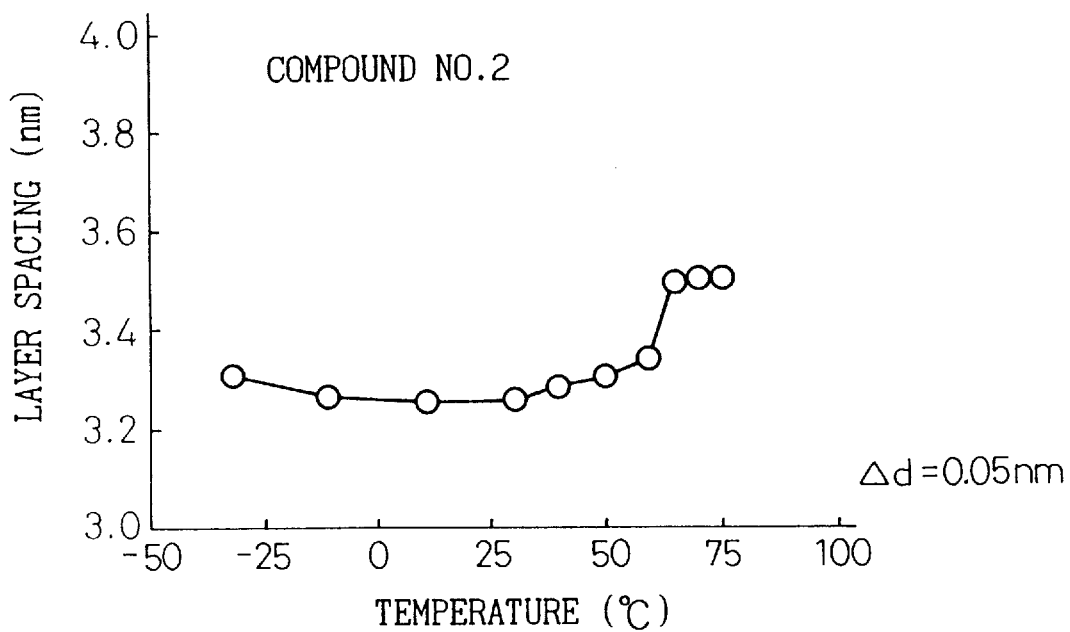

SMECTIC PHASE LAYER STRUCTURE

SMECTIC LIQUID CRYSTAL COMPOSITION AND LIQUID CRYSTAL DISPLAY

BACKGROUND OF THE INVENTION

1. Field of the Invention

The present invention relates to a liquid crystal composition and a liquid crystal display, and particularly it relates to a smectic liquid crystal composition which expresses a ferroelectric phase (hereunder abbreviated as "SmC* phase") or an antiferroelectric phase (hereunder abbreviated as "SmC$_A$* phase") etc., and to a liquid crystal display which employs the smectic liquid crystal composition.

2. Description of the Related Art

Recently, liquid crystal cells have become widely used to take advantage of their characteristics such as thinness, light weight, low electricity consumption, etc., and most of these liquid crystal cells employ nematic liquid crystals.

Since nematic liquid crystals are driven based on the anisotropy of the dielectric constant of the liquid crystal, their speed of response is slow and they are therefore in need of improvement.

In contrast, liquid crystal cells employing liquid crystals exhibiting the chiralsmectic C phase (hereinafter abbreviated as "SmC* phase"), which is ferroelectric and was discovered by Meyer et al., have a high speed response and memory characteristics which are not attained by nematic liquid crystals. Thus, application of ferroelectric liquid crystals to ferroelectric liquid crystal cells, because of these characteristics, is being actively researched.

However, the good orientation and memory characteristics required for liquid crystal cells are difficult to realize in a real cell using the above-mentioned ferroelectric liquid crystals, because ferroelectric liquid crystals are not resistant to external shocks, etc. and thus have many remaining problems to be solved.

On the other hand, Chandani, et al. have recently discovered an antiferroelectric phase (hereinafter abbreviated as "SmC$_A$* phase") which exhibits three stable states at the low temperature end of the SmC* phase. These antiferroelectric liquid crystals exhibit a thermodynamically stable phase wherein dipoles are arranged in anti-parallel at every adjacent layer, and this causes a field-induced phase transition between the antiferroelectric phase and the ferroelectric phase which is characterized by a clear threshold value and double hysteresis characteristics in response to an applied voltage. New methods of indication are beginning to be investigated using this switching behavior.

Liquid crystal compounds with antiferroelectric phases are already known as described in Japanese Unexamined Patent Publication Nos. 1-213390, 1-316339, 1-316367 and 2-28128, and with disclosures of new antiferroelectric liquid crystal compounds, their numbers are ever increasing.

In practical terms, most of the antiferroelectric liquid crystal compounds produced to date have high melting points and temperature ranges for the antiferroelectric phase which are much higher than room temperature. Normally, the liquid crystal materials used for ferroelectric or antiferroelectric liquid crystal cells are mixtures of 5 to 10 different types of liquid crystal compounds. The reason for this is that It is currently impossible to achieve satisfactory characteristics required for liquid crystal cells by using only one type of liquid crystal compound, while the required characteristics can be satisfied by using a mixture of liquid crystal compounds with different physical characteristics, to achieve a balance of characteristics as a whole.

Incidentally, one of the problems involved in applying smectic liquid crystal compositions including ferroelectric liquid crystal compositions and antiferroelectric liquid crystal compositions to liquid crystal cells is disordered orientation due to temperature changes in the liquid crystal cell.

When the temperature changes from a high to a low temperature, the phase of the liquid crystal composition generally changes from smectic A phase (SmA phase) →smectic C* phase (SmC* phase)→smectic C$_A$* phase (SmC$_A$* phase)→smectic I* phase (SmI* phase) or smectic I$_A$* (SmI$_A$* phase). In accordance, the layer spacing of the layer structure in the smectic phase of the liquid crystal composition is drastically reduced from the SmA phase, the reduction becoming more moderate by the SmC$_A$* phase and reaching a minimum at a certain temperature, but then when the temperature is further lowered, it increases again.

On the other hand, when the temperature is raised from a low temperature to a high temperature, the layer spacing undergoes a change opposite to the one described above. The disordered orientation occurs when a cold/hot temperature cycle is applied to the liquid crystal cell.

The reason is believed to be that structural defects occur in the smectic phase layer to absorb the changes in layer spacing during the cold/hot temperature cycle, and thus create the disordered orientation. As a result of this disordered orientation which results in shifting between the liquid crystal optical axis and the polarizing plate angle, light leakage occurs during dark indication periods, thus lowering the value for the contrast represented by the brightness ratio of light indication to dark indication and becoming an obstacle to achieving a clear screen display. In addition, the disordered orientation also tends to produce burning. Burning of the display is a phenomenon caused by the difference in orientation, or brightness, resulting from application of different voltages, such as white indication voltage and black indication voltage, to picture elements with disordered orientation.

For example, as an example of a ferroelectric liquid crystal with temperature dependency of the layer spacing, the display disclosed in Japanese Unexamined Patent Publication No. 2-40625 employs ferroelectric liquid crystals which undergo no change of the layer spacing between the crystalline phase and the smectic phase after crystallization.

However, according to studies by the present inventors, this ferroelectric liquid crystal composition also undergoes variation of the layer spacing with temperature changes within the temperature range of the smectic phase, and thus it has been found that temperature changes within that range cause the disadvantage of disordered orientation and thus a poor indicating function as a liquid crystal cell.

The present inventors have therefore posited that if the layer spacing of smectic liquid crystals is roughly constant throughout temperature changes, then layer structure defects in the smectic phase, as well as disordered orientation, will be suppressed.

Furthermore, as mentioned above, in the case of antiferroelectric liquid crystals, the required physical characteristics cannot be satisfied when only one type of antiferroelectric liquid crystal compound is used to form the liquid crystals in the liquid crystal cell. For example, many liquid crystals have practical problems, such as a temperature range of the antiferroelectric phase which is much higher than room temperature, or a long response time for changes between negative polarity and positive polarity when the driving voltage of the liquid crystal is 50 V or greater. Also, with only one type of liquid crystal compound even the initial orientation is such that the liquid crystal molecules fail to be oriented in the rubbing direction, or even when oriented they have a high degree of light leakage during dark indication periods, thus lowering the contrast.

On the other hand, in the case of liquid crystal compositions which are mixtures of many liquid crystal compounds, the state of orientation is improved, thus lowering the light leakage during dark indication periods.

Consequently, liquid crystal cells are preferably not constructed using only one type of antiferroelectric liquid crystal compound, and as already mentioned they usually require use of an antiferroelectric liquid crystal composition which is a mixture of at least a few types of antiferroelectric liquid crystal compounds. The same also applies to ferroelectric liquid crystals. Because they are used for liquid crystal cells, the compositions must have a low tendency to disordered orientation.

In light of these circumstances, it is an object of the present invention to provide a liquid crystal cell or liquid crystal display which exhibits good contrast by minimizing disordered orientation occurring with temperature changes within a wide range and which has no burnout and high reliability, as well as a smectic liquid crystal composition for use in the liquid crystal cell or liquid crystal display.

SUMMARY OF THE INVENTION

As a result of much diligent research aimed at overcoming these problems, the present inventors have discovered that little disordered orientation occurs in smectic liquid crystal compositions having a layer construction in the liquid crystal molecular arrangement wherein the composition has roughly constant temperature dependency of the layer spacing, and attained the present invention.

BRIEF DESCRIPTION OF THE DRAWINGS

FIG. 1 is a graph showing the relationship between layer spacing and temperature for antiferroelectric liquid crystal compound No. 1 in the Table 1.

FIG. 2 is a graph showing the relationship between layer spacing and temperature for antiferroelectric liquid crystal compound No. 2 in the Table 1.

DESCRIPTION OF A PREFERRED EMBODIMENT

The smectic liquid crystal composition is preferably one that exhibits at least either of a smectic $C_A^*$ phase or a smectic $I_A^*$ phase.

According to actual studies by the present inventors, it is believed that the reduction in contrast after a cold/hot temperature cycle from the temperature during stable driving of the liquid crystal cell (45° C.–60° C.) to –20° C. at the low temperature end is allowable to within 10% of the initial contrast. The disordered orientation after a cold/hot temperature cycle is represented by the value obtained by subtracting the dark luminance $T_1$ (%) during the initial orientation prior to the cold/hot temperature cycle from the dark luminance $T_2$ (%) after the cold/hot temperature cycle ($T_2-T_1$), and this value is the degree of light leakage. Also, in terms of contrast it was found that the allowable range for the light leakage ($T_2-T_1$) must be 0.1% or lower.

Here, the dark luminance (%) and the degree of light leakage (%) is based on 100% luminance as defined by the following. A polarizing microscope is set up by arranging a light source behind a transparent glass plate and setting on the front side of the glass plate a photoelectric transfer element. The light from the light source comes to the photoelectric transfer element through the glass plate. The power supply to the light source is adjusted so that the output of the element is 1000 mV, when the luminance is measured, which luminance is defined as 100%.

First, the present inventors investigated different smectic liquid crystal compounds for temperature dependency of the layer spacings. Also, those with a temperature dependent variation (difference between minimum value and maximum value of layer spacing within the prescribed temperature range) of less than a given value were selected as smectic liquid crystal compounds with roughly constant temperature dependency of the liquid crystal spacings (hereinafter mentioned as the first smectic liquid crystal compound), while those above the given value were classified as smectic liquid crystal compounds with a variable temperature dependency of the layer spacings (hereinafter mentioned as the second liquid crystal smectic compound).

Figure 8:
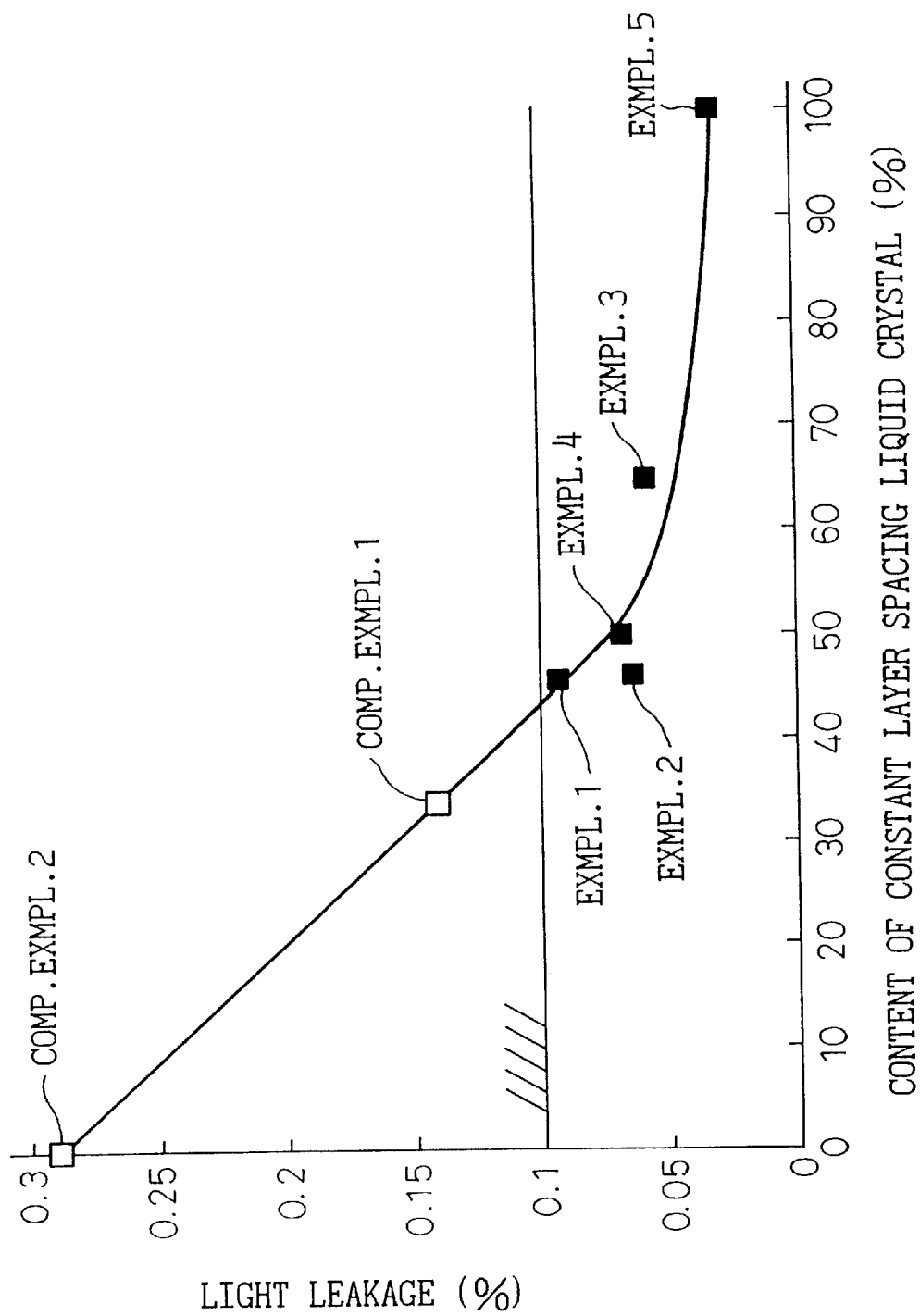
FIG. 8 is a graph showing the relationship between light leakage and contents of the liquid crystal compounds with roughly constant temperature dependency of the layer spacings, for Examples 1 to 3, Examples 4 and 5 and Comparative Examples 1 and 2.

Next, in order to prepare smectic liquid crystal compositions using these 2 types of smectic liquid crystal compounds, we studied the relationship between the proportions of the smectic liquid crystal compounds with roughly constant temperature dependency of the layer spacings in smectic liquid crystal compositions and the degree of light leakage after a cold/hot temperature cycle of liquid crystal cells with those proportions. The results, as shown in FIG. 8, revealed that the light leakage can be kept to below 0.1% if the proportion of the smectic liquid crystal compound with roughly constant temperature dependency of the layer spacing in the smectic liquid crystal composition is above a given value.

In other words, it was found that light leakage due to variation in the layer spacing after a cold/hot temperature cycle process virtually disappears when, as the mixed composition of at least one type of first smectic liquid crystal compound with roughly constant temperature dependency of the layer spacing and a second smectic liquid crystal compound with variable temperature dependency of the layer spacing, there is used a smectic liquid crystal composition of which the proportion of the first smectic liquid crystal compound in the mixed composition is at least 45 wt %. Thus, liquid crystal cells employing this smectic liquid crystal composition have reduced disordered orientation due to temperature change and provide high reliability with satisfactory contrast and no burning.

Here, if the proportion of the first smectic liquid crystal compound in said mixed composition is at least 50 wt % then the light leakage due to variation in the layer spacing after the cold/hot temperature cycle process may be further reduced. More preferably, if the proportion of the first smectic liquid crystal compound in said mixed composition is at least 60 wt % then it may be even further reduced.

An antiferroelectric liquid crystal compound usable as the second smectic liquid crystal compound is represented by the following chemical structural formula (1):

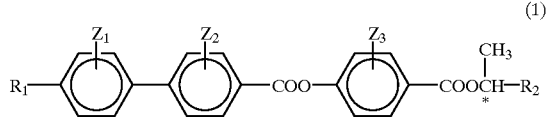

(1)

wherein, $R_1$ and $R_2$ represent alkyl groups, alkoxy groups, alkylcarbonyl groups or alkylcarbonyloxy groups of 2 to 20 carbon atoms, $Z_1$, $Z_2$ and $Z_3$ each independently represent a hydrogen atom or halogen atom, and at least one thereof is a halogen atom.

Thus, in addition to realizing the above-mentioned effect, it is possible to realize satisfactory initial orientation darkness with low light leakage during dark indication periods.

In addition, the antiferroelectric liquid crystal compound used as the second smectic liquid crystal compound may be a compound for which of the values for the layer spacing in the temperature range from the temperature which gives the minimum value to the crystallization temperature, the difference between the maximum value and the minimum value is greater than 0.1 nm and not greater than 0.4 nm.

The present inventors have also found that if the smectic liquid crystal composition comprises a composition of only at least 2 types of smectic liquid crystal compounds with roughly constant temperature dependency of the layer spacing, then light leakage due to variation in the layer spacing after the cold/hot temperature cycle process virtually disappears. Thus, liquid crystal cells employing this smectic liquid crystal composition have reduced disordered orientation due to temperature change and provide high reliability with satisfactory contrast and no burning.

The smectic liquid crystal compound with roughly constant temperature dependency of the layer spacing may be a smectic liquid crystal compound which has a roughly constant layer spacing value in the temperature range from the temperature which gives the minimum value for the compound layer spacing to the crystallization temperature. Moreover, the values for the layer spacing in the temperature range are preferably such that the difference between the maximum value and the minimum value is no greater than 0.1 nm.

A kind of antiferroelectric liquid crystal compounds usable as the smectic liquid crystal compounds of the smectic liquid crystal composition of the present invention are represented by the following chemical structural formula (2):

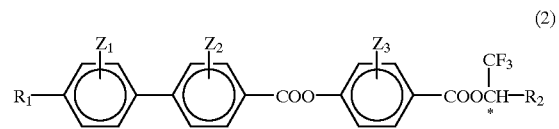

(2)

wherein, $R_1$ and $R_2$ represent alkyl groups, alkoxy groups, alkylcarbonyl groups or alkylcarbonyloxy groups of 2 to 20 carbon atoms, $Z_1$, $Z_2$ and $Z_3$ each independently represent a hydrogen atom or halogen atom, and at least one thereof is a halogen atom.

Also, of the antiferroelectric liquid crystal compounds used as the smectic liquid crystal compounds of the smectic liquid crystal composition of the present invention are represented by the following structural formula (3):

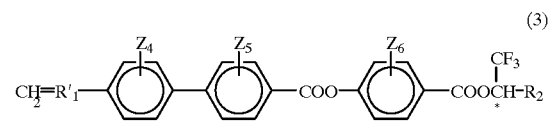

(3)

wherein, $R_2$, represents the same meaning as above, $CH_2=R'_1$— represent alkenyl groups, alkenyloxy groups, alkenylcarbonyl groups or alkenylcarbonyloxy groups of 3 to 21 carbon atoms, and $Z_4$, $Z_5$ and $Z_6$ each independently represent a hydrogen atom or halogen atom.

In the above formula (2) or (3), $R_1$ and $R_2$ preferably represent alkyl groups, alkoxy groups or alkylcarbonyl groups, of 2 to 20 carbon atoms, and $CH_2=R'_1$— preferably represent alkenyl groups, alkenyloxy groups or alkenylcarbonyl groups of 3 to 21 carbon atoms.

The compounds represented by the formula (2) and (3) may, of course, be included in one smectic liquid crystal composition.

As a result of further diligent research, the present inventors have also found that disordered orientation is minimized with a larger spontaneous polarization at the temperature which gives the minimum value for the layer spacing of the smectic liquid crystal compound. That is, the effects of the present invention may be further stabilized if the spontaneous polarization at the temperature which gives the minimum value for the layer spacing of the smectic liquid crystal compound is at least 160 $nC/cm^2$.

Furthermore, if the smectic liquid crystal compound has a difference of no greater than 0.1 nm between the maximum value and the minimum value of the values for the layer spacing in the temperature range of −20° C. to 60° C. which is the general temperature range used for liquid crystal cells, the light leakage due to variation in the layer spacing after the cold/hot temperature cycle process virtually disappears, thus producing no disordered orientation of the liquid crystals. In addition, liquid crystal cells employing this smectic liquid crystal composition have reduced disordered orientation due to temperature change and provide high reliability with satisfactory contrast and no burning.

The smectic liquid crystal composition of the present invention can be enclosed in a liquid crystal cell or in a liquid crystal display.

Thus, since the layer spacing in the liquid crystal cell or the liquid crystal display is roughly constant even with temperature change caused by a cold/hot temperature cycle, disordered orientation due to the temperature change is reduced and high reliability is realized with satisfactory contrast and no burning.

Finally, a liquid crystal cell or a liquid crystal display including the smectic liquid crystal composition, enclosed between electrode plates, may essentially consist of the smectic liquid crystal composition comprising a mixed composition of at least one type of a first smectic liquid crystal compound with roughly constant temperature dependency of the layer spacing and a second smectic liquid crystal compound with variable temperature dependency of the layer spacing, and the proportion of the first smectic liquid crystal compound in the mixed composition being a proportion such that when the liquid crystal cell or display is subjected to a cold/hot temperature cycle wherein the temperature is lowered from the temperature which gives the minimum value for the layer spacing of the smectic liquid crystal composition to $-20°$ C. and then raised again to that temperature, the relative change $(T_2-T_1)$ between the dark luminance $T_1$ (%) during periods of dark indication of the liquid crystal cell at the temperature prior to the cold/hot temperature cycle and the dark luminance $T_2$ (%) during dark indication of the liquid crystal cell at the temperature after the cold/hot temperature cycle is no greater than 0.1%. In this liquid crystal cell or display, disordered orientation due to the temperature change is thus reduced and high reliability may be realized with satisfactory contrast and no burning.

First embodiment

A first embodiment of the present invention will now be explained. According to this embodiment, a compound conforming to structural formulas (1) and (2) above is used (hereinafter referred to as "non-double-bond type"). Table 1 gives the structural formulas for antiferroelectric liquid crystal compounds No. 1 to No. 7 used for this embodiment, and FIGS. 1 to 7 show the relationship between temperature and layer spacing for each of the antiferroelectric liquid crystal compounds No. 1 to No. 7. Also, Table 2 gives the compositional ratios of 6 antiferroelectric liquid crystal compositions (Examples 1–5 and 7) using the antiferroelectric liquid crystal compounds No. 1 to No. 7.

(1) Examples of antiferroelectric liquid crystal compositions comprising 2 types of antiferroelectric liquid crystal compounds with roughly constant temperature dependency of the layer spacing and an antiferroelectric liquid crystal compound with variable temperature dependency of the layer spacing (Examples 1–3).

The present inventors prepared antiferroelectric liquid crystal compositions comprising mixtures of each of the antiferroelectric liquid crystal compounds with the structural formulas indicated as No. 1 to No. 6 in Table 1 in the compositional ratios listed in Table 2, as Examples 1 to 3, and constructed liquid crystal cells using these antiferroelectric liquid crystal compositions.

TABLE 1

| No. | Chemical Structure formula |
|---|---|
| 1 | $C_8H_{17}O$–⬡–⬡(F)–COO–⬡(F)–COOCH*–$C_6H_{13}$ / $CF_3$ |
| 2 | $C_{10}H_{21}O$–⬡–⬡(F)–COO–⬡(F)–COOCH*–$C_6H_{13}$ / $CF_3$ |
| 3 | $C_9H_{19}$–⬡–⬡–COO–⬡(F)–COOCH*–$C_5H_{11}$ / $CF_3$ |
| 4 | $C_9H_{19}O$–⬡(F)–⬡–COO–⬡–COOCH*–$C_4H_9$ / $CF_3$ |
| 5 | $C_9H_{19}O$–⬡–⬡(F)–COO–⬡(F)–COOCH*–$C_6H_{13}$ / $CH_3$ |
| 6 | $C_{10}H_{21}O$–⬡(F)–⬡–COO–⬡–COOCH*–$C_6H_{13}$ / $CH_3$ |
| 7 | $C_{10}H_{21}O$–⬡–⬡–COO–⬡–COOCH*–$C_6H_{13}$ / $CH_3$ |

TABLE 2

| Comd. | Exmpl. 1 | Exmpl. 2 | Exmpl. 3 | Exmpl. 4 | Exmpl. 5 | Exmpl. 7 |
|---|---|---|---|---|---|---|
| 1 | 25.2 | 25.2 | 36.0 | 50.0 | 50.0 | 50.0 |
| 2 | 21.0 | 21.0 | 30.0 | — | 50.0 | — |
| 3 | 11.9 | 11.9 | 17.0 | 10.0 | — | 10.0 |
| 4 | 11.9 | 11.9 | 17.0 | 10.0 | — | 10.0 |
| 5 | — | 30.0 | — | 30.0 | — | — |
| 6 | 30.0 | — | — | — | — | — |
| 7 | — | — | — | — | — | 30.0 |

Specifically, the liquid crystal cells were each constructed in the following manner.

The antiferroelectric liquid crystal composition of Example 1 was cast between two electrode plates. The cell gap was about 1.7 μm. The electrode plates were formed by coating a transparent substrate with transparent electrodes made of, for example, $InO_3$, $SnO_2$, ITO (mixed oxide of indium oxide and tin oxide), with an orientation control film made of polyvinyl alcohol or polyimide. The antiferroelectric liquid crystal compositions of Examples 2 and 3 were constructed in the same manner.

The antiferroelectric liquid crystal compound according to structural formula No. 1 exhibited the relationship between temperature and layer spacing as shown in FIG. 1, and the antiferroelectric liquid crystal compound according to structural formula No. 2 exhibited the relationship between temperature and layer spacing as shown in FIG. 2.

Thus, the layer spacings of the antiferroelectric liquid crystal compounds No. 1 and No. 2 were roughly constant across a wide temperature range. Through the embodiments, a roughly constant temperature dependency of the layer spacing means that the layer spacing is no greater than 0.1 nm in the temperature range from the temperature at which it is minimum to −20° C. In FIGS. 1 and 2, the symbol Δd indicates the difference between the minimum layer spacing value and the layer spacing value at −20° C. (hereunder referred to as the layer spacing variation). In other words, the roughly constant temperature dependency of the layer spacing means that Δd is no greater than 0.1 nm.

Figure 3:
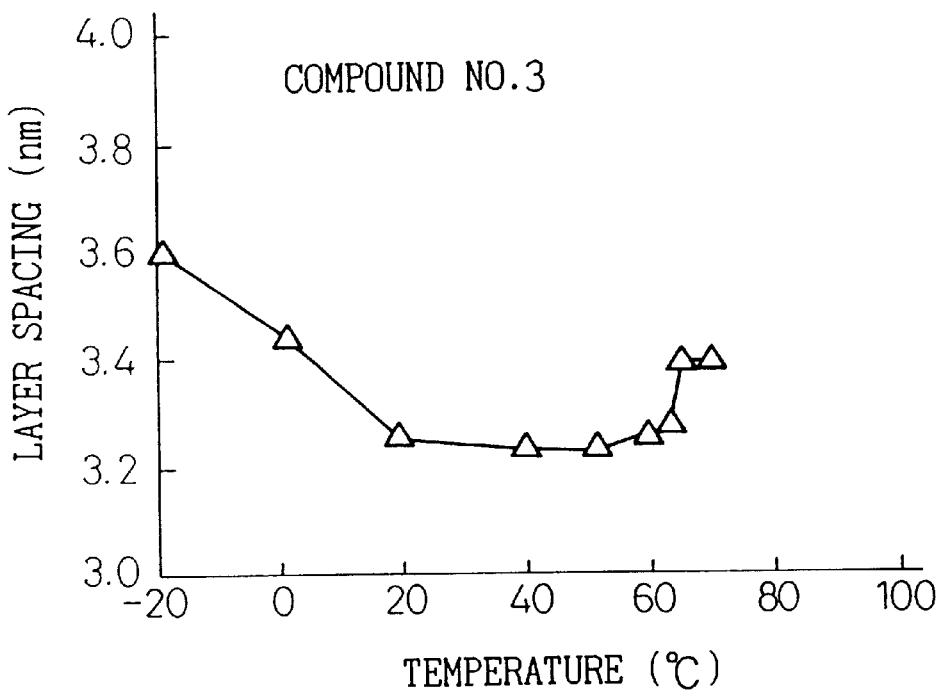
FIG. 3 is a graph showing the relationship between layer spacing and temperature for antiferroelectric liquid crystal compound No. 3 in the Table 1.
Figure 4:
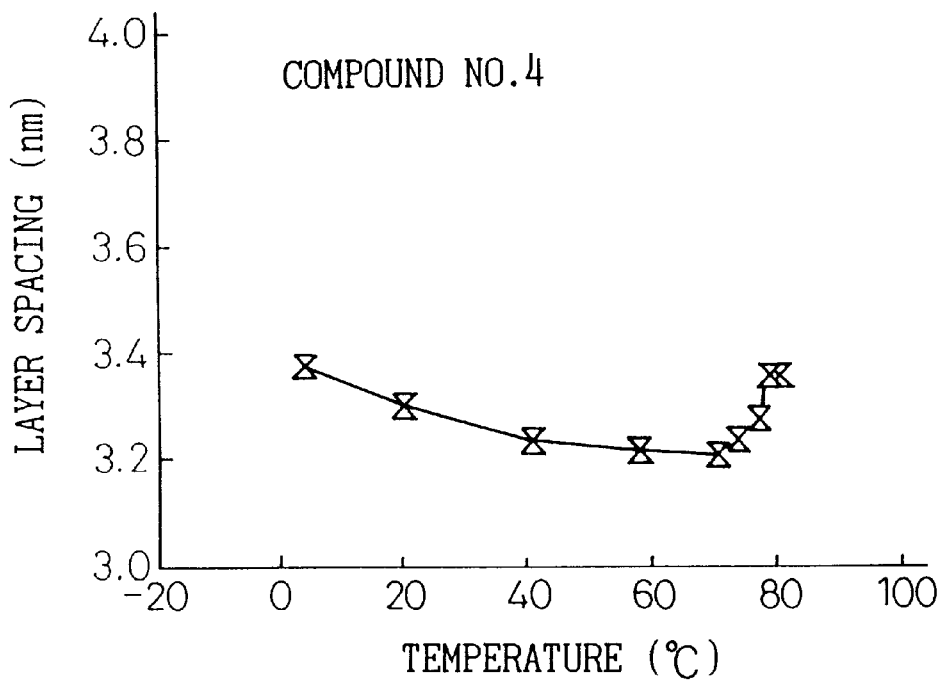
FIG. 4 is a graph showing the relationship between layer spacing and temperature for antiferroelectric liquid crystal compound No. 4 in the Table 1.
Figure 5:
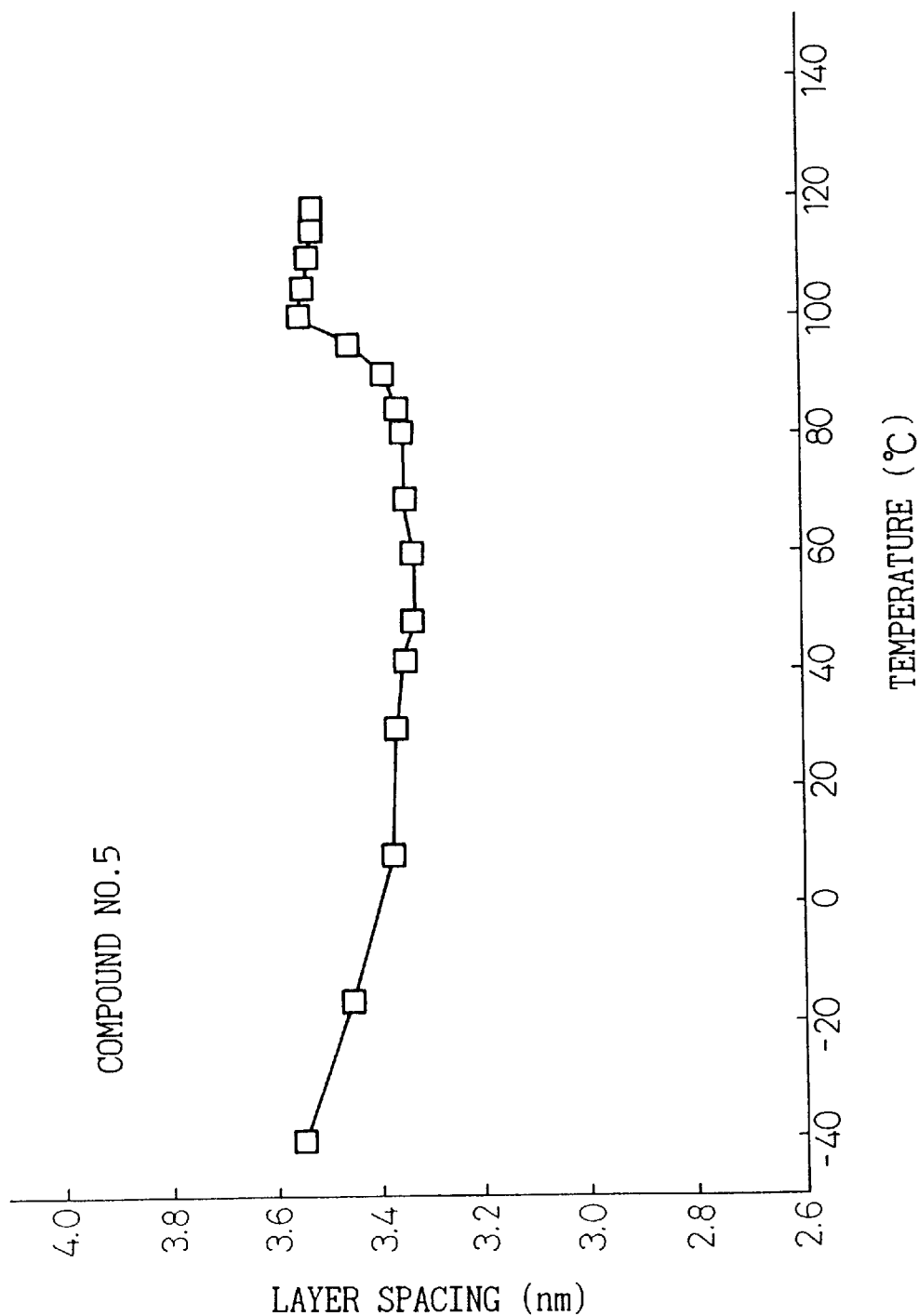
FIG. 5 is a graph showing the relationship between layer spacing and temperature for antiferroelectric liquid crystal compound No. 5 in the Table 1.
Figure 6:
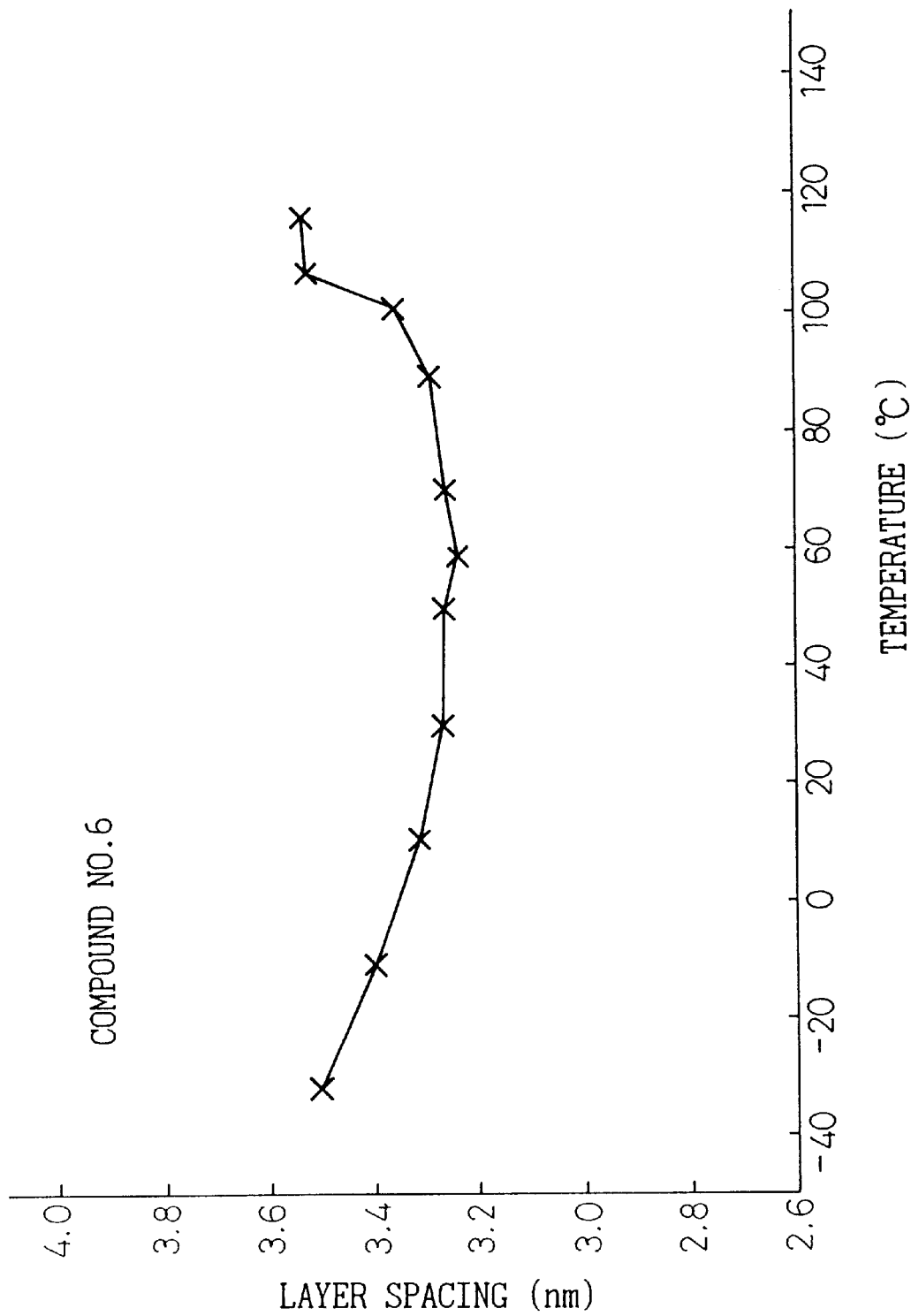
FIG. 6 is a graph showing the relationship between layer spacing and temperature for antiferroelectric liquid crystal compound No. 6 in the Table 1.
Figure 7:
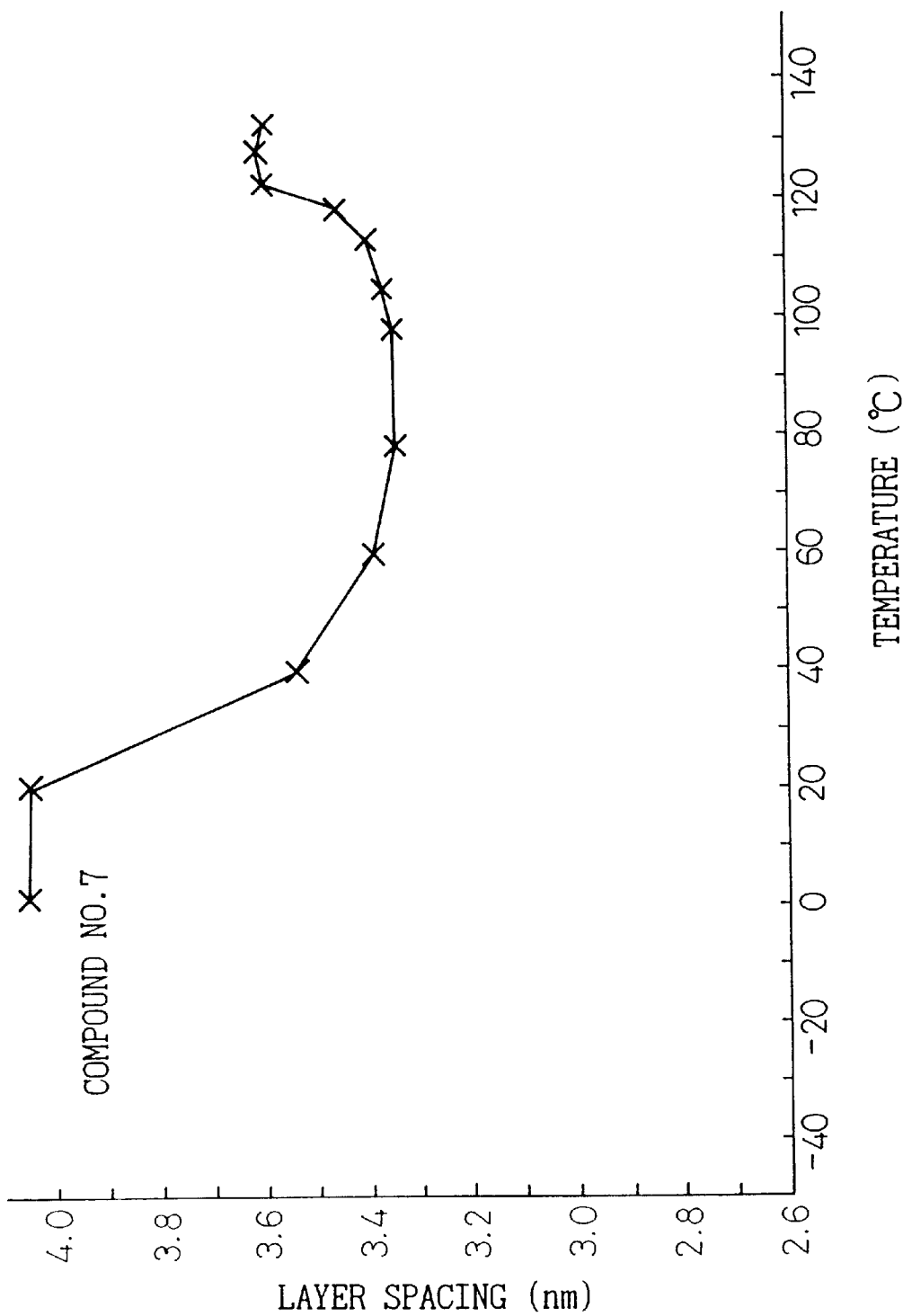
FIG. 7 is a graph showing the relationship between layer spacing and temperature for antiferroelectric liquid crystal compound No. 7 in the Table 1.

Also, the antiferroelectric liquid crystal compound according to structural formula No. 3 exhibited a relationship between temperature and layer spacing as shown in FIG. 3, the antiferroelectric liquid crystal compound according to structural formula No. 4 exhibited a relationship between temperature and layer spacing as shown in FIG. 4, the antiferroelectric liquid crystal compound according to structural formula No. 5 exhibited a relationship between temperature and layer spacing as shown in FIG. 5, and the antiferroelectric liquid crystal compound according to structural formula No. 6 exhibited a relationship between temperature and layer spacing as shown in FIG. 6.

Of these antiferroelectric liquid crystal compounds according to structural formulas No. 3 to No. 6, for those such as compound No. 4, which has a crystallization temperature higher than −20° C. and thus crystallized up to −20° C. making measurement of the layer spacing impossible, Δd is the difference between the minimum layer spacing value and the layer spacing value at the crystallization temperature. On the other hand, for those with a crystallization temperature lower than −20° C., such as compound No. 5, Δd is the difference between the minimum layer spacing value and the layer spacing value at −20° C. Compounds No. 3 to No. 6 all have Δd of at least 0.1 nm and thus may be considered smectic liquid crystal compounds with variable temperature dependency of the layer spacings.

The data for the temperature dependency of each of the layer spacings of the antiferroelectric liquid crystal compounds No. 1 to No. 6 were determined by small-angle X-ray scattering.

That is, each of the antiferroelectric liquid crystal compounds was poured into a capillary tube (inner diameter=0.3 mm–0.7 mm) made of quartz glass or applied onto a glass plate made of quartz glass, and a temperature-controllable (−50 to 150° C.) small-angle X-ray scattering apparatus was used to determine the layer spacing of the antiferroelectric liquid crystal compound from the scattering peak angles.

Also, the compositional ratios of each of the antiferroelectric liquid crystal compositions of Examples 1 to 3 were as shown in Table 2.

To cite one case, the compositional ratios (wt %) of the antiferroelectric liquid crystal compounds according to structural formulas No. 1, No. 2, No. 3, No. 4 and No. 6 in the antiferroelectric liquid crystal composition of Example 1 were 25.2, 21.0, 11.9, 11.9 and 30.0.

The antiferroelectric liquid crystal compositions of Examples 1 to 3 were subjected to a cold/hot temperature cycle, and the orientation darkness (light leakage) was measured in the following manner.

Each of the liquid crystal cells prepared in the manner described above was set in a polarizing microscope. The liquid crystal cell was set on a hot stage whose temperature was controllable to within 0.1° C. Also, the temperature of each antiferroelectric liquid crystal composition was raised once to keep it in the liquid phase, after which the temperature was gradually lowered at a lowering rate of no greater than 1.0° C./min (or K/min) for orientation. Satisfactory orientation was achieved by applying a triangular wave or rectangular wave electric field at this time.

The dark luminance of each liquid crystal cell was measured in this state. First, the optical axis of the liquid crystal cell is aligned with either of two polarizing plates of the polarizing microscope. Aging is accomplished by application of an electric field at the temperature which gives the smallest layer spacing according to the data for the temperature dependency of the layer spacing. For the aging conditions, an application voltage was used with a rectangular wave of ±40 V and 30 Hz, and the voltage application time was 5 minutes. The dark luminance $T_1(\%)$ at this time was defined as the value for the initial orientation darkness. After a cold/hot temperature cycle in which the temperature was lowered at a lowering rate of 2.0° C./min (or K/min) and upon reaching −20° C. returned to the original temperature at a temperature elevating rate of 2.0° C./min (or K/min), the dark luminance $(T_2)\%$ was then measured. Also, the relative change $(T_2-T_1)$ from dark luminance $T_1$ to dark luminance $T_2$ was defined as the degree of light leakage. A liquid crystal cell must have a light leakage of no greater than 0.1%. The 100% base of the dark luminance (%) and the degree of light leakage (%) are as defined before.

In the cold/hot temperature cycle, the temperature elevating or temperature lowering rate was 2.0° C./min (or K/min) as mentioned above, but a study by the present inventors has confirmed that the temperature dependency of the layer spacing does not depend on the temperature elevating or lowering rate.

In each of the examples of the present invention, the dark luminance $T_1$, dark luminance $T_2$, light leakage $(T_2-T_1)$, layer spacing and Δd were all measured by the methods described above.

As a result of subjecting each of the aforementioned liquid crystal cells to this measurement, the light leakage data given in FIG. 8 was obtained. For comparison, FIG. 8 also shows the light leakages for Comparative Examples 1 and 2 subjected to the same cold/hot temperature cycle.

Thus, each of the liquid crystal cells containing the antiferroelectric liquid crystal compositions of Examples 1 to 3 had a light leakage of 0.1 or lower. Also, the liquid crystal compositions of the liquid crystal cells had contents of 46%–66% of the liquid crystal compounds No. 1 and No. 2 which had roughly constant temperature dependency of the layer spacings. From the graph in FIG. 8 it can be seen that a content of 43% or greater of these compounds is sufficient to ensure a light leakage of 0.1% or lower.

Thus, the light leakage can be kept to 0.1% or lower if the contents of the aforementioned 2 types of antiferroelectric liquid crystal compounds with roughly constant temperature dependency of the layer spacings are at least 45% (see FIG. 8). Also, the light leakage can be kept to 0.06% or lower if those contents are at least 50% (see FIG. 8). Moreover, the light leakage can be kept to 0.05% or lower if those contents are at least 60% (see FIG. 8).

Compositional ratio deviations for liquid crystal compositions are generally permitted to be within a few percent of the characteristic values. For example, if the content of a certain liquid crystal compound in a certain liquid crystal composition is 10%, there may be a few percent of deviation in the content, such as 9.5% or 10.5% without much variation in the characteristic values. Consequently, the contents of 45% and 50% may be permitted deviations of about ±2–3%, and the content of 60% may be permitted a deviation of about ±3–4%.

Here, roughly constant temperature dependency of the layer spacing means that the variation in the layer spacing is no greater than 0.1 nm from the temperature at which the layer spacing value of the smectic $C_A^*$ phase is a minimum to the crystallization temperature (for example, −20° C.).

Table 3 below shows the layer spacing variation $\Delta d$ and the actual light leakage for each of the liquid crystal cells with the antiferroelectric liquid crystal compositions of Examples 1 to 3 and both Comparative Examples 1 and 2, after the cold/hot temperature cycle. The light leakages in Table 3 are also shown in FIG. 8.

The light leakages were ranked A (very good), B (good) or C (bad), in Table 3.

TABLE 3

| No. | $\Delta d$ | Light Leakage (%) | Evaluation |
| --- | --- | --- | --- |
| Exmpl. 1 | 1.0 | 0.095 | B |
| Exmpl. 2 | 0.7 | 0.065 | A |
| Exmpl. 3 | 0.5 | 0.060 | A |
| Comp. Exmpl. 1 | 1.5 | 0.140 | C |
| Comp. Exmpl. 2 | 2.5 | 0.290 | C |

The compositions of the above Comparative Examples 1 and 2 are shown in the following Tables 4 and 5.

TABLE 4

Composition of Comparative Example 1

| No. | Chemical Structural Formula | |
| --- | --- | --- |
| 10 | $C_{10}H_{21}$—⌬⌬—COO—⌬—COO—CH(CF$_3$)*—C$_4$H$_9$ | 38 wt% |
| 11 | $C_9H_{19}$—⌬⌬—COO—⌬—COO—CH(CF$_3$)*—C$_5$H$_{11}$ | 7 wt% |
| 12 | $C_{10}H_{21}$—⌬⌬—COO—⌬—COO—CH(CF$_3$)*—C$_6$H$_{13}$ | 4 wt% |
| 13 | $C_{11}H_{23}$—⌬⌬—COO—⌬—COO—CH(CF$_3$)*—C$_4$H$_9$ | 17 wt% |
| 14 | $C_7H_{15}O$—⌬⌬(F)—COO—⌬(F)—COO—CH(CF$_3$)*—C$_6$H$_{13}$ | 34 wt% |

TABLE 5

Composition of Comparative Example 2

| No. | Chemical Constitutional Formula | |
| --- | --- | --- |
| 15 | $C_{10}H_{21}$—⌬⌬—COO—⌬—COO—CH(CF$_3$)*—C$_4$H$_9$ | 35 wt% |
| 16 | $C_9H_{19}$—⌬⌬—COO—⌬—COO—CH(CF$_3$)*—C$_5$H$_{11}$ | 9 wt% |
| 17 | $C_{10}H_{21}$—⌬⌬—COO—⌬—COO—CH(CF$_3$)*—C$_6$H$_{13}$ | 5 wt% |

TABLE 5-continued

Composition of Comparative Example 2

| No. | Chemical Constitutional Formula | |
|---|---|---|
| 18 | $C_{11}H_{23}$—⟨⟩—⟨⟩—COO—⟨⟩—COO—CH(CF$_3$)*—C$_4$H$_9$ | 21 wt% |
| 19 | $C_9H_{19}O$—⟨⟩—⟨⟩(F)—COO—⟨⟩—COOCH(CF$_3$)*—C$_6H_{13}$ | 30 wt% |

Comparative Example 1 is a blend of compound Nos. 10 to 14. In the compound Nos. 10 to 14, the compound No. 1 4 has relatively constant temperature dependency of the layer spacings than other compound i.e. compound Nos. 10 to 13. The compound No. 1 4 has similar chemical structure to compound No. 5 and only has different carbon number of an alkyl group. The compound No. 5 is classified, in the above, as a member of variable temperature dependency of the layer spacings. However, in FIG. 8, the compound No. 1 4 is regarded as a compound with roughly constant temperature dependency of the layer spacings.

In this first embodiment, the layer spacing can be kept roughly constant over a wide temperature range if the liquid crystal cell includes an antiferroelectric liquid crystal composition according to one of Examples 1 to 3 which contain the above-mentioned 2 types of liquid crystal compounds No. 1 and No. 2 having roughly constant temperature dependency of the layer spacings, as explained above, and therefore high reliability may be realized while maintaining satisfactory indication contrast, and with no burning.

(2) Example of antiferroelectric liquid crystal composition comprising one type of antiferroelectric liquid crystal compound with roughly constant temperature dependency of the layer spacing and an antiferroelectric liquid crystal compound with variable temperature dependency of the layer spacing (Example 4)

As shown in Table 2, an antiferroelectric liquid crystal composition containing 50 wt % of the antiferroelectric liquid crystal compound No. 1 with roughly constant temperature dependency of the layer spacing and 10 wt %, 10 wt % and 30 wt %, respectively, of the antiferroelectric liquid crystal compounds No. 3, No. 4 and No. 5 with variable temperature dependency of the layer spacings, was used in place of the antiferroelectric liquid crystal composition of Example 1 above, and was included in a liquid crystal cell prepared for Example 4. Measurement of the dark luminances of this liquid crystal cell of Example 4 gave the results shown in FIG. 8. The light leakage is seen to be about 0.07%. Thus, substantially the same effect as the liquid crystal cell of Example 2 can be realized with the liquid crystal cell of Example 4.

(3) Example of antiferroelectric liquid crystal composition comprising two types of antiferroelectric liquid crystal compounds with roughly constant temperature dependency of the layer spacing (Example 5)

As shown in Table 2, an antiferroelectric liquid crystal composition containing 50 wt % each of the antiferroelectric liquid crystal compounds No. 1 and No. 2 with roughly constant temperature dependency of the layer spacings but containing no antiferroelectric liquid crystal compound with variable temperature dependency of the layer spacing, was used in place of the antiferroelectric liquid crystal composition of Example 1 above, and was included in a liquid crystal cell prepared for Example 5. Measurement of the dark luminances of this liquid crystal cell of Example 5 gave the results shown as the values in FIG. 8.

The light leakage is seen to be about 0.04%. Thus, with the liquid crystal cell of Example 5 it is possible to realize an even better effect than the liquid crystal cells of Examples 1 to 4. Incidentally, the number of antiferroelectric liquid crystal compounds with roughly constant temperature dependency of the layer spacings may be further increased.

(4) Example of antiferroelectric liquid crystal composition comprising only one type of antiferroelectric liquid crystal compound with roughly constant temperature dependency of the layer spacing (Example 6)

For example, the antiferroelectric liquid crystal compound represented by the following chemical structural formula (4) has a layer spacing variation ad of no greater than 0.1 nm. This antiferroelectric liquid crystal compound was used in place of the antiferroelectric liquid crystal composition of Example 1 for injection into the liquid crystal cell prepared as Example 6. The physical characteristics of this liquid crystal cell of Example 6 were also measured.

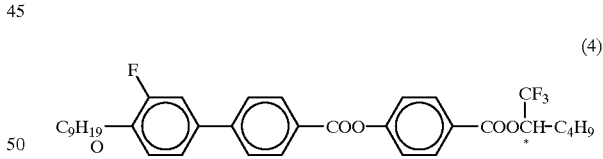

(4)

The response time (response time from the ferroelectric phase of one polarity to the ferroelectric phase of the other polarity) upon application of a rectangular wave voltage with ±50 V and a pulse width of 1 msec at 30° C. was 150 μsec, a value much larger than the practical target value of 30 μsec. Consequently, the various physical characteristics required for a liquid crystal cell cannot be met with only one type of liquid crystal compound represented by structural formula (4). In other words, it was demonstrated that with only one type of antiferroelectric liquid crystal compound, it is impossible to meet all of the physical characteristics required for a liquid crystal cell.

(5) Example employing antiferroelectric liquid crystal composition comprising many types of antiferroelectric liquid crystal compounds.

When an antiferroelectric liquid crystal composition is applied to elements of an optical switch or display, usually an antiferroelectric liquid crystal composition comprising about 10 different types, or more than 10 types of antiferroelectric liquid crystal compounds must be used in order to bestow the antiferroelectric liquid crystal composition with the physical characteristic values required for each element.

Since high contrast is demanded from the standpoint of indication quality of the elements of the optical switch or display, the initial orientation darkness (dark luminance $T_1\%$) must be low, and is usually preferred to be no greater than 1%.

Here, the values for the initial orientation darkness (dark luminance $T_1$) for each of the liquid crystal cells with antiferroelectric liquid crystal compounds of Examples 1–5 and Example 7 and for Comparative Examples 1 and 2 after the cold/hot temperature cycle are shown in Table 4 together with the values for the layer spacing variation $\Delta d$ and the light leakage $(T_2-T_1)$. The examples which excellently achieved the initial orientation darkness target ($\leq 1\%$) and the light leakage target ($\leq 0.1\%$), respectively, are indicated by A (excellent) or B (good), and those which did not are indicated by C.

TABLE 6

| | $\Delta d$ (nm) | Initial Orientation Darkness (%) | Rank | Light Leakage (%) | Rank |
|---|---|---|---|---|---|
| Exmpl. 1 | 0.1 | 0.702 | B | 0.095 | B |
| Exmpl. 2 | 0.07 | 0.675 | B | 0.065 | A |
| Exmpl. 3 | 0.05 | 1.430 | C | 0.060 | A |
| Exmpl. 4 | 0.07 | 0.724 | B | 0.070 | A |
| Exmpl. 5 | 0.05 | 2.050 | C | 0.035 | A |
| Exmpl. 7 | 0.1 | 0.718 | B | 0.100 | B |
| Comp. Exmpl. 1 | 0.15 | 0.560 | B | 0.140 | C |
| Comp. Exmpl. 2 | 0.25 | 0.573 | B | 0.290 | C |

Example 7 is an antiferroelectric liquid crystal composition mixed with the compositional ratio shown in Table 2, for which the layer spacing variation $\Delta d$, the initial orientation darkness (dark luminance $T_1$) and light leakage were measured in the same manner as described above. The structural formula for the antiferroelectric liquid crystal compound No. 7 is shown in FIG. 1, and the relationship between the temperature and layer spacing as measured in the manner described above is shown in FIG. 7.

Focusing on the initial orientation darkness in Table 6, the initial orientation darkness for Examples 1, 2, 4, 7 and Comparative Examples 1 and 2 were lower than for Examples 3 and 5. The compositions of Examples 1, 2, 4, 7 and Comparative Examples 1 and 2 were mixed compositions of an antiferroelectric liquid crystal compound in which the asymmetrical carbon side chain was a trifluoromethyl group (—CF$_3$) (hereunder referred to as CF3 type) and an antiferroelectric liquid crystal compound in which the asymmetrical carbon side chain was a methyl group (—CH$_3$) (hereunder referred to as CH3 type), whereas the compositions of Examples 3 and 5 differ in that they consist of only the CF3 type compound. Accordingly, it is seen that a mixed composition of CF3 type and CH3 type is preferred for a lower initial orientation darkness.

Table 6 may also be studied from the standpoint of the light leakage affected by the disordered orientation due to the cold/hot temperature cycle. Comparative Examples 1 and 2 of course do not apply since their light leakages exceeded 0.1%. Example 7 had a light leakage of 0.1% and was therefore just within the allowable range.

The composition of Example 7 was a type in which compound No. 5 of Example 4 was replaced with compound No. 7. Referring to Table 1, the difference between compound No. 5 and compound No. 7 in terms of structure is a matter of whether or not the hydrogen atoms on the benzene ring are substituted with fluorine atoms. Also, from FIGS. 5 and 7 it can be seen that the layer spacing variation $\Delta d$ was rather large for compound No. 7 at 0.7 nm in comparison with 0.2 nm for compound No. 5.

Accordingly, when the composition contains a CH3 type with a large layer spacing variation $\Delta d$, such as compound No. 7, in order to further reduce the initial orientation darkness while preventing disordered orientation due to cold/hot temperature cycles which is the object of the present invention, stable prevention of disordered orientation due to the cold/hot temperature cycle may not be achieved. A CH3 type with a small layer spacing variation $\Delta d$ is therefore necessary.

The present inventors studied the relationship between temperature and layer spacing for many publicly known CH3 type antiferroelectric liquid crystal compounds. The studied CH3 types all had layer spacing variations $\Delta d$ of larger than 0.1 nm and variable temperature dependency of the layer spacings, and none had roughly constant temperature dependency of the layer spacings. However, the present inventors have found that antiferroelectric liquid crystal compounds represented by the following structural formula (1) have relatively small layer spacing variation $\Delta d$ among the CH3 types.

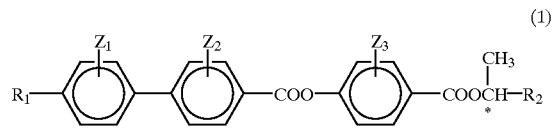

(1)

In this structural formula (1), $R_1$ and $R_2$ represent alkyl groups, alkoxy groups, alkylcarbonyl groups or alkylcarbonyloxy groups of 2 to 20 carbon atoms, $Z_1$, $Z_2$ and $Z_3$ each independently represent a hydrogen atom or halogen atom, and at least one thereof is a halogen atom. Here, the halogen atom is preferred to be fluorine from the standpoint of chemical stability.

Also, if the antiferroelectric liquid crystal composition comprises a CH3 type according to the structural formula (1) and an antiferroelectric liquid crystal compound with roughly constant temperature dependency of the layer spacing, with a content of the latter of at least about 45 wt %, preferably at least about 50 wt % and more preferably at Least about 60 wt %, then the light leakage may be reduced, stable prevention of disordered orientation due to cold/hot temperature cycles can be achieved, and reduction in the initial orientation darkness can also be achieved.

FIGS. 1 to 7 show the relationship between temperature and layer spacing for antiferroelectric liquid crystal compounds represented by structural formulas No. 1 to No. 7 in Table 1. Comparing these antiferroelectric liquid crystal compounds with variable temperature dependency of the layer spacings, all except No. 7 had $\Delta d$ of greater than 0.1 nm and less than 0.4 nm. As seen in Table 6, Example 7, which was the composition with compound No. 7 as the main component, had a light leakage of 0.1% which was just within the allowable range. Accordingly, when an antiferroelectric liquid crystal compound with variable temperature dependency of the layer spacing is included in the liquid crystal composition of the present invention, Δd thereof is preferably no greater than about 0.4 nm.

Table 6 also shows that when the layer spacing variation Δd of the antiferroelectric liquid crystal composition is no greater than 0.1 nm, the light leakage is kept to under 0.1%. Liquid crystal cells are usually used in a temperature range of −20 −60° C. Consequently, if the layer spacing variation Δd of the antiferroelectric liquid crystal composition used in the liquid crystal cell is no greater than 0.1 nm, then it is possible to avoid disordered orientation of the liquid crystals during use of the liquid crystal cell.

Second embodiment

A second embodiment of the present invention will now be explained, and this second embodiment employs antiferroelectric liquid crystal compounds represented by the following structural formula 13 (double-bond type), unlike the non-double-bond type antiferroelectric liquid crystal compounds used in the first embodiment described above.

The present invention can also be carried out to provide an antiferroelectric liquid crystal composition similar to the first embodiment if it contains at least 50% of a mixture of an antiferroelectric liquid crystal compound according to any of structural formulas No. 1 to No. 7 and an antiferroelectric liquid crystal compound used in the second embodiment described above.

The present invention can also be carried out by employing smectic liquid crystal compositions which are, for example ferroelectric liquid crystal compositions, and not only antiferroelectric liquid crystal compositions. For example, the smectic liquid crystal composition may be prepared by mixing an antiferroelectric or ferroelectric liquid crystal compound with roughly constant temperature dependency of the layer spacing in an amount of 45% to 50% with an antiferroelectric or ferroelectric liquid crystal compound with variable temperature dependency of the layer spacing.

Furthermore, the embodiments described above were examples using antiferroelectric liquid crystal compositions with roughly constant temperature dependency of the layer spacing of the smectic $C_A^*$ phase even with temperature changes across a wide range, but even using an antiferro- (5)

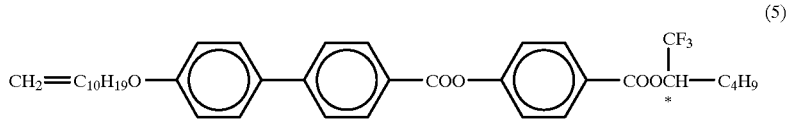

Figure 9:
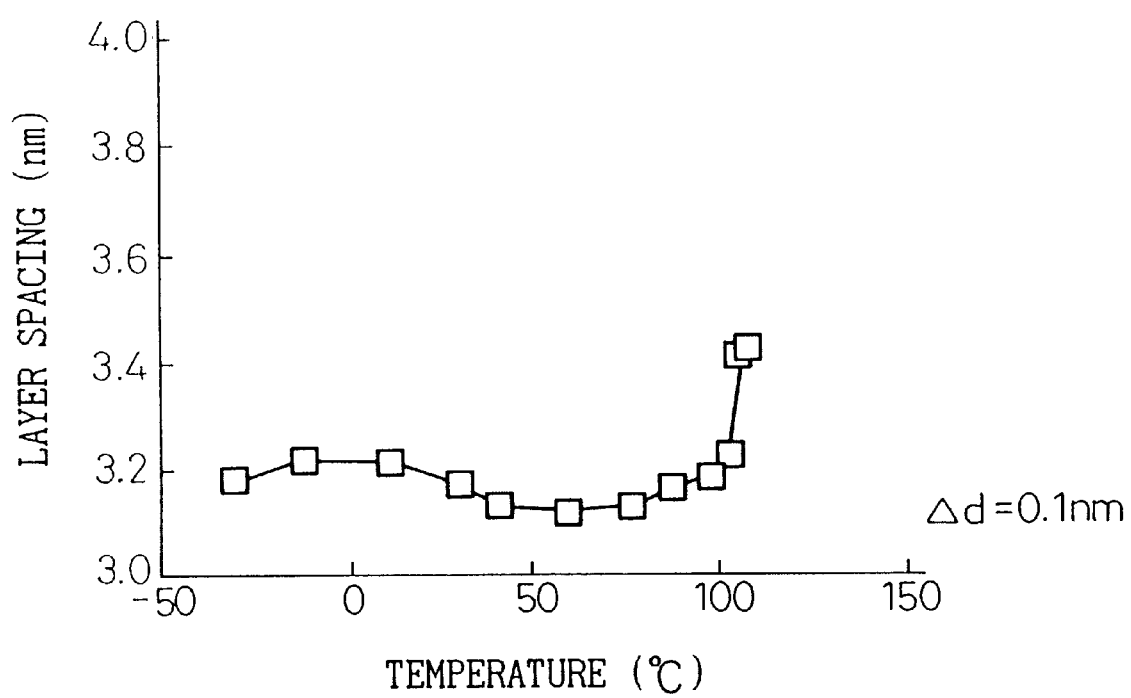
FIG. 9 is a graph showing the relationship between layer spacing and temperature for the antiferroelectric liquid crystal compounds of the second embodiment of the invention.

Upon measurement of the temperature dependency of the layer spacing of the antiferroelectric liquid crystal compound of structural formula (5) in the same manner as described for the first embodiment above, data was obtained indicating the relationship between layer spacing and temperature as shown in FIG. 9. Here, the layer spacing variation Δd was 0.1 nm.

Accordingly, by forming an antiferroelectric liquid crystal composition containing this antiferroelectric liquid crystal compound at 45% or greater, preferably 50% or greater, more preferably 60% or greater, it is possible to obtain an antiferroelectric liquid crystal composition with roughly constant layer spacing similar to the antiferroelectric liquid crystal compositions of Examples 1 to 5 and Example 7 mentioned in the first embodiment.

Furthermore, liquid crystal cells or a liquid crystal display including this antiferroelectric liquid crystal composition can provide high reliability with good indication contrast and no burning, similar to the first embodiment.

electric liquid crystal composition with roughly constant temperature dependency of the layer spacing of either the smectic $C_A^*$ phase or smectic $I_A^*$ phase across a wide temperature range, it is still possible to achieve substantially the same action and effect as Examples 1 to 5 and Example 7 described above.

Third embodiment

A third embodiment of the present invention will now be explained. The present inventors used 4 antiferroelectric liquid crystal compounds represented by structural formulas No. 5 and No. 6 shown in Table 1 and No. 8 and No. 9 shown in Table 7, to prepare 3 antiferroelectric liquid crystal compositions with the compositional ratios show in Table 8, as Examples 8 to 10. All of these 4 antiferroelectric liquid crystal compounds have variable temperature dependency of the layer spacings.

TABLE 7

| No. | Chemical Structural formula |
|---|---|
| 8 | $C_{10}H_{21}O$—⬡—⬡—COO—⬡—COOCH*(CF₃)—C₄H₉ |
| 9 | $C_9H_{19}$—⬡—⬡—COO—⬡—COOCH*(CF₃)—C₅H₁₁ |

TABLE 8

| Compound No. | Example 8 | Example 9 | Example 10 |
|---|---|---|---|
| 5 | 0 | 30 | 0 |
| 6 | 40 | 0 | 30 |
| 8 | 0 | 30 | 30 |
| 9 | 60 | 40 | 40 |

The spontaneous polarization of these Examples 8 to 10 was measured at the temperature which gave the minimum layer spacing value of each. The spontaneous polarization was measured by the well-known Sawyer-Tower method at the temperature which gave the minimum layer spacing value for each antiferroelectric liquid crystal composition. The spontaneous polarization was 120 nC/cm$^2$ for Example 8, 155 nC/cm$^2$ for Example 9 and 180 nC/cm$^2$ for Example 10.

Figure 10:
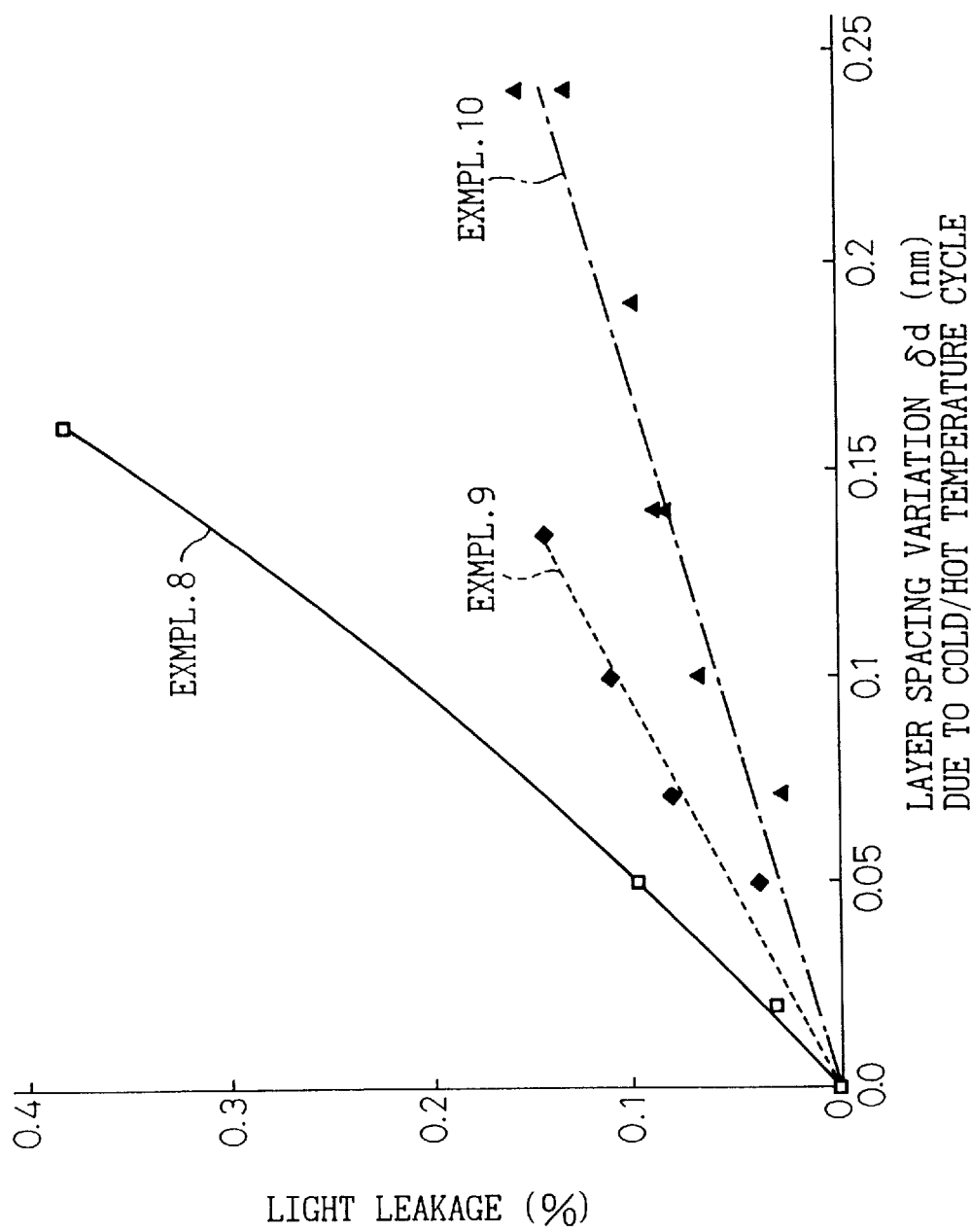
FIG. 10 is a graph showing the relationship between layer spacing variation and light leakage with a cold/hot temperature cycle for the antiferroelectric liquid crystal compositions of Examples 8 to 10 for the third embodiment.

Here, FIG. 10 shows the light leakage corresponding to the layer spacing variation δd (different from Δd mentioned above) in a cold/hot temperature cycle test on three antiferroelectric liquid crystal compositions (Examples 8–10) with different spontaneous polarizations. The cold/hot temperature cycle test for this embodiment involved lowering the temperature from the temperature $t_1$ which gave the minimum layer spacing value to an arbitrary temperature t, and then raising the temperature to $t_1$ again. The temperature elevating/lowering rate was 2.0° C./min, as in the previous cases. Here, representing the layer spacing at temperature $t_1$ as $d[t_1]$ and the layer spacing at the arbitrary temperature t as $d[t]$, the layer spacing variation δd at this time may be represented by $δd=d[t]-d[t_1]$. Also, temperature t and $d[t]$ were varied for the same sample to obtain different values for δd. The dark luminance T was also measured at temperature t, and the relative change $(T-T_1)$ from the initial orientation darkness (dark luminance $T_1$), or light leakage, was determined. FIG. 10 shows δd on the horizontal axis and the light leakage $(T-T_1)$ on the vertical axis, with the light leakages $(T-T_1)$ plotted with respect to δd for each of the Examples 8 to 10.

Incidentally, the antiferroelectric liquid crystal compositions of Examples 8 to 10, unlike those of Examples 1 to 5 and Example 7, consisted solely of antiferroelectric liquid crystal compounds with variable temperature dependency of the layer spacings. Consequently, these antiferroelectric liquid crystal compositions of Examples 8 to 10 had δd of greater than 0.1 nm at temperature t.

In FIG. 10, the value on the horizontal axis when the light leakage on the vertical axis is 0.1% is the allowable value for the layer spacing variation δd in the cold/hot temperature cycle test. For example, the allowable value for the layer spacing of the composition in Example 10 is about 0.17 nm, and therefore the light leakage can be kept to no greater than 0.1% if the layer spacing variation with temperature change is less than 0.17 nm. Upon comparing the antiferroelectric liquid crystal compositions of Examples 8 to 10, Example 10 which had the largest spontaneous polarization had the largest allowable value for the layer spacing variation δd in the cold/hot temperature cycle test. In other words, a large spontaneous polarization can be said to inhibit disordered orientation even with a large variation in the layer spacing with temperature change. Accordingly, an even greater effect against disordered orientation due to cold and hot temperature changes is achieved with a large spontaneous polarization in addition to a roughly constant layer spacing.

Figure 11:
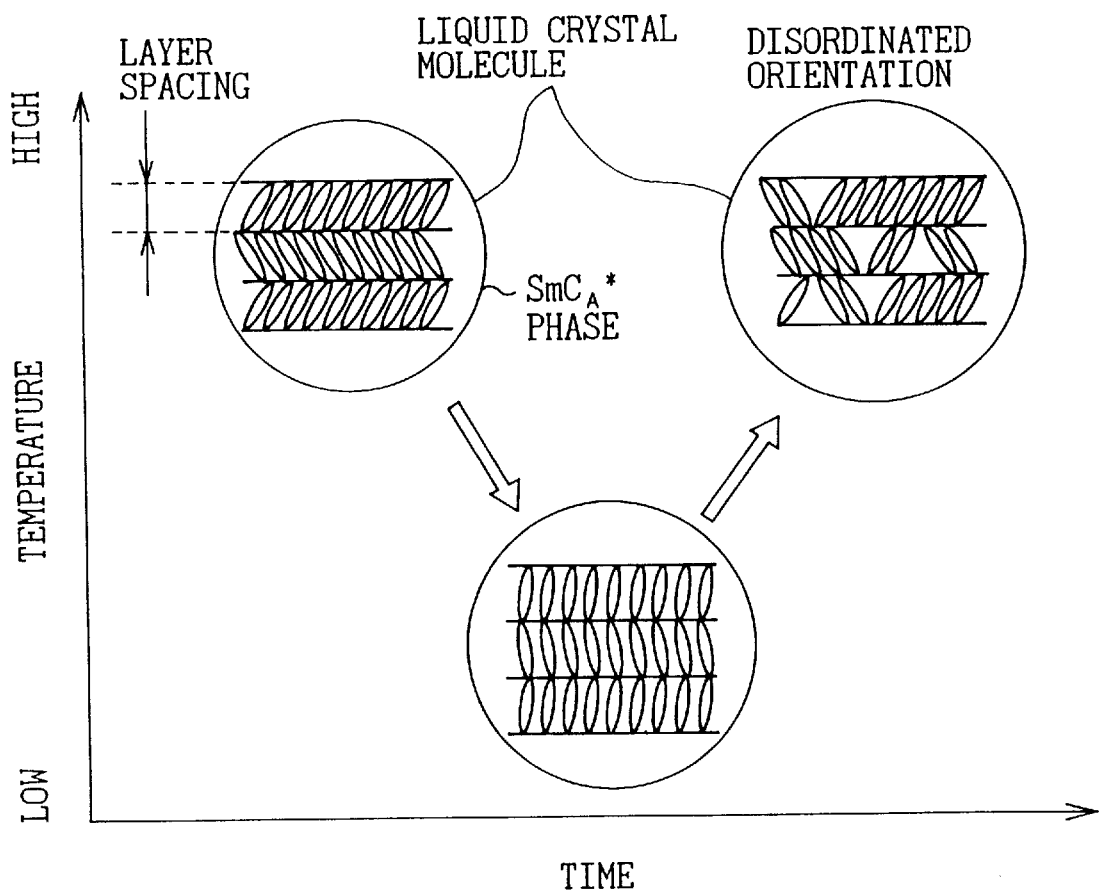
FIG. 11 is a graphical representation of the state of change in the layer structure of the smectic phase of antiferroelectric liquid crystals due to temperature change over time.

The reason that disordered orientation occurs less in antiferroelectric liquid crystal compositions with large spontaneous polarizations at the temperature which gives the minimum layer spacing is believed to be as follows. FIG. 11 shows a layer structure model for disordered orientation. The layer spacing increases as the temperature is lowered from the temperature which gives the minimum layer spacing, but during the process of raising the temperature back to the temperature which gives the minimum layer spacing, structural defects occur in the smectic phase layer to alleviate the layer spacing variation, thus causing disordered orientation. It is thought therefore that since the orientation is most disordered at the temperature which gives the minimum layer spacing, the larger the spontaneous polarization of the antiferroelectric liquid crystal composition at this temperature, the greater the interaction between the liquid crystal molecules, which tends to result in less layer structure change, or disordered orientation. Since the spontaneous polarization is larger and the interaction between molecules is greater even with ferroelectric liquid crystals, a larger spontaneous polarization tends to inhibit disordered orientation in the same manner as antiferroelectric liquid crystals.

Furthermore, the explanation of the above model also naturally suggests the effectiveness of a large spontaneous polarization against disordered orientation due to cold/hot temperature cycles, also for antiferroelectric liquid crystal compositions consisting of mixtures of only smectic liquid crystal compounds with roughly constant temperature dependency of the layer spacings, as well as for antiferroelectric liquid crystal compositions consisting of mixtures of smectic liquid crystal compounds with roughly constant temperature dependency of the layer spacings and smectic liquid crystal compounds with variable temperature dependency of the layer spacings, such as the compositions of Examples 1 to 5 and Example 7.

Figure 12:
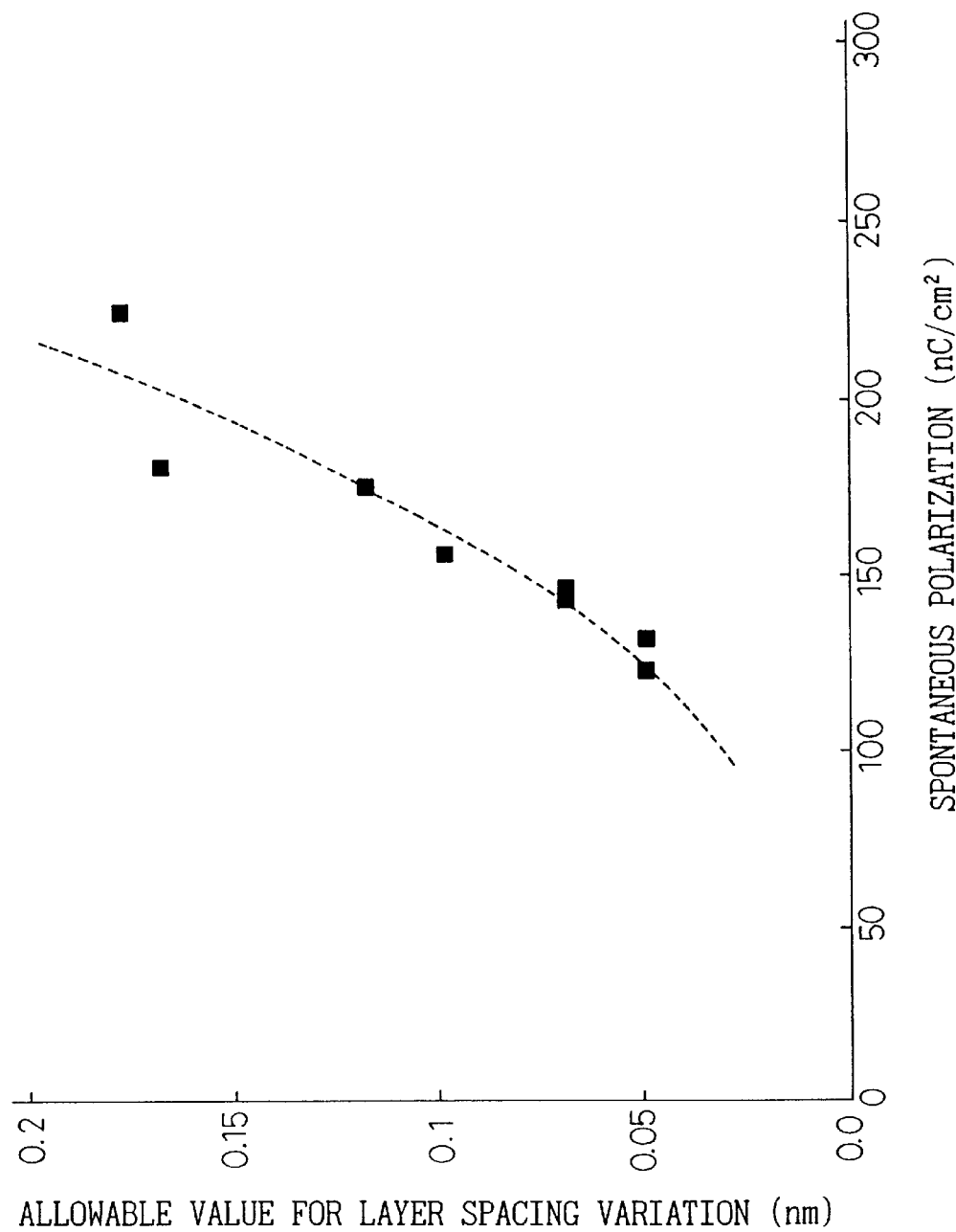
FIG. 12 is a graph showing the relationship between spontaneous polarization and allowable layer spacing variation values for the different antiferroelectric liquid crystal compositions of the third embodiment of the invention.

FIG. 12 shows the results of studying the relationship between spontaneous polarization at the temperature which gives the minimum layer spacing and the allowable value for the layer spacing variation δd in the cold/hot temperature cycle test by the same method as described above, for different antiferroelectric liquid crystal compositions using smectic liquid crystal compounds with roughly constant temperature dependency of the layer spacings and smectic liquid crystal compounds with variable temperature dependency of the layer spacings. These results demonstrate that if the spontaneous polarization is at least 160 nC/cm$^2$, the light leakage can be kept to no greater than 0.1% even after a cold/hot temperature cycle which causes variation of the composition layer spacing of over 0.1 nm. Accordingly, liquid crystal cells employing antiferroelectric liquid crystal compositions with large spontaneous polarizations (at least 160 nC/cm$^2$) are resistant to disordered orientation even with temperature change of the layer spacings, which means that it is possible to obtain indication elements with high quality maintaining satisfactory contrast, and high reliability with no burning.

We claim:

1. A smectic liquid crystal composition having a layer construction in a liquid crystal molecular arrangement, which comprises a mixed composition of at least one type of first smectic liquid crystal compound, wherein a difference between a maximum value and a minimum value of a layer spacing of the layer construction in a temperature range from a temperature which gives the minimum value for the layer spacing to −20° C. or a crystallization temperature for compounds which have a crystallization temperature higher than −20° C., is not greater than 0.1 nm, and at least one type of second smectic liquid crystal compound with variable temperature dependency of the layer spacing, the proportion of said first smectic liquid crystal compound to said mixed composition being at least 45 wt %, wherein said second smectic liquid crystal compound is an antiferroelectric liquid crystal compound, the molecular structure of the antiferroelectric liquid crystal compound being represented by the following structural formula (1)

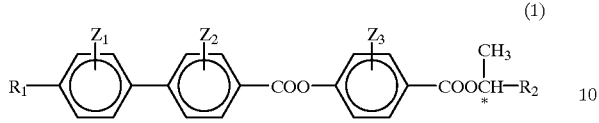

(1)

wherein $R_1$ and $R_2$ represent alkyl groups, alkoxy groups, alkylcarbonyl groups or alkylcarbonyloxy groups of 2 to 20 carbon atoms, and $Z_1$, $Z_2$ and $Z_3$ each independently represent a hydrogen atom or halogen atom, and at least one thereof is a halogen atom.

2. The smectic liquid crystal composition according to claim 1, characterized in that the first smectic liquid crystal compound is represented by the following chemical structural formula (3):

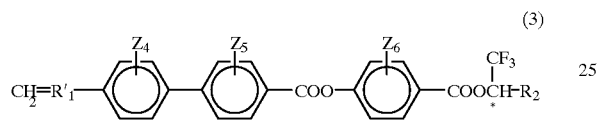

(3)

wherein $CH_2=R'1-$ represent alkenyl groups, alkenyloxy groups, alkenylcarbonyl groups or alkenyl.carboxy groups of 3 to 21 carbon atoms; $R_2$ represent alkyl groups, alkoxy groups, alkylcarbonyl groups or alkylcarboxy groups of 2 to 20 carbon atoms; and $Z_4$, $Z_5$ and $Z_6$ each independently represent a hydrogen atom or halogen atom.

3. A smectic liquid crystal composition having a layer construction in a liquid crystal molecular arrangement, which comprises a mixed composition of at least one type of first smectic liquid crystal compound, wherein a difference between a maximum value and a minimum value of a layer spacing of the layer construction in a temperature range from a temperature which gives the minimum value for the layer spacing to −20° C. or a crystallization temperature for compounds which have a crystallization temperature higher than −20° C., is not greater than 0.1 nm, and at least one type of second smectic liquid crystal compound with variable temperature dependency of the layer spacing, the proportion of said first smectic liquid crystal compound to said mixed composition being at least 45 wt %, wherein said first and second smectic liquid crystal compounds are antiferroelectric liquid crystal compounds, the molecular structures of the antiferroelectric liquid crystal compounds being represented by the following structural formula (2) or (3):

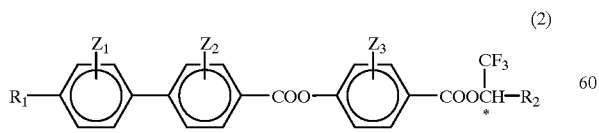

(2)

wherein $R_1$ and $R_2$ represent alkyl groups, alkoxy groups, alkylcarbonyl groups or alkylcarbonyloxy groups of 2 to 20 carbon atoms, and $Z_1$, $Z_2$ and $Z_3$ each independently represent a hydrogen atom or halogen atom, and at least one thereof is a halogen atom; and

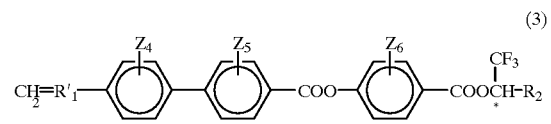

(3)

wherein $CH_2=R'_1$ represent alkenyl groups, alkenyloxy groups, alkenylcarbonyl groups or alkenylcarbonyloxy groups of 3 to 21 carbon atoms, $R_2$ represents alkyl alkylcarbonyloxy groups of 2 to 20 carbon atoms, and $Z_4$, $Z_5$ and $Z_6$ each independently represent a hydrogen atom or a halogen atom.

4. A smectic liquid crystal composition having a layer construction in a liquid crystal molecular arrangement, which comprises a mixed composition of at least one type of first smectic liquid crystal compound, wherein a difference between a maximum value and a minimum value of a layer spacing of the layer construction in a temperature range from a temperature which gives the minimum value for the layer spacing to −20° C. or a crystallization temperature for compounds which have a crystallization temperature higher than −20° C., is not greater than 0.1 nm, and at least one type of second smectic liquid crystal compound with variable temperature dependency of the layer spacing, the proportion of said first smectic liquid crystal compound to said mixed composition being at least 45 wt %, wherein spontaneous polarization at the temperature which gives the minimum value for the layer spacing is at least 160 nC/cm².

5. A smectic liquid crystal composition having a layer construction in a liquid crystal molecular arrangement, which comprises a mixed composition of at least one type of first smectic liquid crystal compound, wherein a difference between a maximum value and a minimum value of a layer spacing of the layer construction in a temperature range from a temperature which gives the minimum value for the layer spacing to −20° C. or a crystallization temperature for compounds which have a crystallization temperature higher than −20° C., is not greater than 0.1 nm, and at least one type of second smectic liquid crystal compound with variable temperature dependency of the layer spacing, the proportion of said first smectic liquid crystal compound to said mixed composition being at least 45 wt %, wherein the values for the layer spacing of said second smectic liquid crystal compound in the temperature range from the temperature which gives the minimum value for the layer spacing to the crystallization temperature, the difference between the maximum value and the minimum value is greater than 0.1 nm and not greater than 0.4 nm, wherein the first smectic liquid crystal compound is represented by the following chemical structural formula (2) and the second smectic liquid crystal compound is represented by the following chemical structural formula (1):

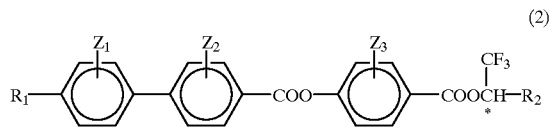

(2)

-continued

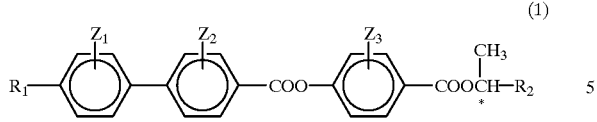

wherein $R_1$ and $R_2$ represent alkyl groups, alkoxy groups, alkylcarbonyl groups or alkylcarboxy groups of 2 to 20 carbon atoms; and $Z_1$, $Z_2$ and $Z_3$ each independently represent a hydrogen atom or halogen atom, and at least one thereof is a halogen atom.

6. A liquid crystal display comprising a smectic liquid crystal composition having a layer construction in the liquid crystal molecular arrangement,
wherein said smectic liquid crystal composition comprises a mixed composition of at least one type of first smectic liquid crystal compound,
wherein the difference between a maximum value and a minimum value of a layer spacing of the layer construction in a temperature range from a temperature which gives the minimum value for the layer spacing to −20° or crystallization temperature for compounds which have a crystallization temperature higher than −20°, is not greater than 0.1 nm, and
at least one type of second smectic liquid crystal compound with variable temperature dependency of the layer spacing, wherein of the values for the layer spacing of said second smectic liquid crystal compound in the temperature range from the temperature which gives the minimum value for the layer spacing in the crystallization temperature, the difference between the maximum value and the minimum value is greater than 0.1 nm and not greater than 0.4 nm,
and wherein the proportion of said first smectic liquid crystal compound in said mixed composition is a proportion such that when said liquid crystal cell is subjected to a cold/hot temperature cycle wherein the temperature is lowered from the temperature which gives the minimum value for the layer spacing of said smectic liquid crystal composition to −20° or crystallization temperature for compounds which have a crystallization temperature higher than −20° and then raised again to the temperature which gives the minimum value for the layer spacing of said smectic liquid crystal composition, the relative change $(T_2-T_1)$ between a dark luminance $T_1$ (%) during periods of dark indication of said liquid crystal cell at said temperature prior to said cold/hot temperature cycle and a dark luminance $T_2$ (%) during dark indication of said liquid crystal cell at said temperature after said cold/hot temperature cycle is no greater than 0.1%,
wherein said first and second smectic liquid crystal compounds are antiferroelectric liquid crystal compounds, molecular structures of the antiferroelectric liquid crystal compounds being represented by the following structural formula (2) or (3):

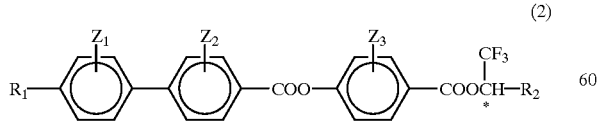

wherein $R_1$ and $R_2$ represent alkyl groups, alkoxy groups, alkylcarbonyl groups or alkylcarbonyloxy groups of 2 to 20 carbon atoms, $Z_1$, $Z_2$, and $Z_3$ each independently represent a hydrogen atom or halogen atom, and at least one thereof is a halogen atom; and

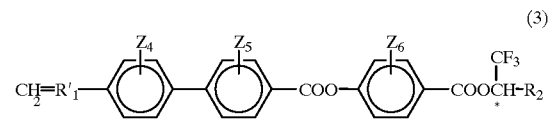

wherein $CH_2=R'_1$ represent alkenyl groups, alkenyloxy groups, alkenylcarbonyl groups or alkenylcarbonyloxy groups of 3 to 21 carbon atoms, $R_2$ represent alkyl groups, alkoxy groups, alkycarbonyl groups or alkylcarbonyloxy groups of 2 to 20 carbon atoms, and $Z_4$, $Z_5$ and $Z_6$ each independently represent a hydrogen atom or a halogen atom.

7. A smectic liquid crystal composition having a layer construction in a liquid crystal molecular arrangement, which comprises a mixed composition of at least two types of compounds, each compound of said composition having a difference between a maximum value and a minimum value for the layer spacing in a temperature range from a temperature which gives the minimum value for the layer spacing to −20° C. or a crystallization temperature for compounds which have a crystallization temperature higher than −20° C., being not greater than 0.1 nm,
wherein said two types of smectic liquid crystal compounds are antiferroelectric liquid crystal compounds, molecular structures of the antiferroelectric liquid crystal compounds being represented by the following structural formula (2) or (3):

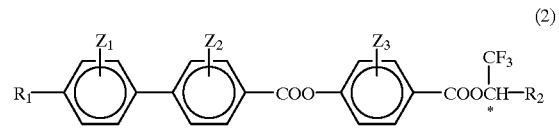

wherein $R_1$ and $R_2$ of structural formula (2) represent alkyl groups, alkoxy groups, alkylcarbonyl groups or alkylcarbonyloxy groups of 2 to 20 carbon atoms, $Z_1$, $Z_2$, and $Z_3$ each independently represent a hydrogen atom or a halogen atom, and at least one thereof is a halogen atom; and

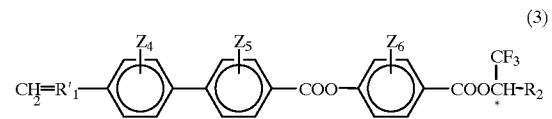

wherein $CH_2=R'_1$ represent alkenyl groups, alkenyloxy groups, alkenylcarbonyl groups of alkenylcarbonyloxy groups of 3 to 21 carbon atoms, $R_2$ represent alkyl groups, alkoxy groups, alkylcarbonyl groups or alkylcarbonyloxy groups of 2 to 20 carbon atoms, and $Z_4$, $Z_5$, and $Z_6$ each independently represent a hydrogen atom or a halogen atom.

8. A liquid crystal display, comprising the liquid crystal according to any one of claims 1, 3, 4, 5, or 2.

* * * * *